(12) United States Patent
Susca et al.

(10) Patent No.: US 12,055,099 B2
(45) Date of Patent: Aug. 6, 2024

(54) TWO STAGE FUEL DELIVERY SYSTEM FOR AN AIRCRAFT

(71) Applicant: Hamilton Sundstrand Corporation, Charlotte, NC (US)

(72) Inventors: Ryan Prescott Susca, Windsor, CT (US); Todd Haugsjaahabink, Amherst, MA (US); Naison E. Mastrocola, Goshen, CT (US); Adrian L. Stoicescu, Roscoe, IL (US); Zachary Allen Ray LeDuc, Rockford, IL (US); Eric Briggs, Enfield, CT (US); Morgan O'Rorke, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/868,222

(22) Filed: Jul. 19, 2022

(65) Prior Publication Data

US 2024/0026825 A1 Jan. 25, 2024

(51) Int. Cl.
*F02C 7/236* (2006.01)
*F02C 9/26* (2006.01)
*F02C 9/28* (2006.01)

(52) U.S. Cl.
CPC .............. *F02C 7/236* (2013.01); *F02C 9/263* (2013.01); *F02C 9/28* (2013.01); *F05D 2220/323* (2013.01); *F05D 2270/3015* (2013.01)

(58) Field of Classification Search
CPC .......... F02C 7/232; F02C 7/236; F02C 9/263; F02C 9/30; F04B 41/06; F04D 13/12
See application file for complete search history.

(56) References Cited

U.S. PATENT DOCUMENTS

| 5,118,258 | A | * | 6/1992 | Martin | F02C 7/236 60/734 |
|---|---|---|---|---|---|
| 7,770,388 | B2 | | 8/2010 | Desai | |
| 8,408,233 | B2 | | 4/2013 | Reuter et al. | |
| 8,523,537 | B2 | | 9/2013 | Garry | |
| 8,834,134 | B2 | | 9/2014 | Baker et al. | |

(Continued)

FOREIGN PATENT DOCUMENTS

GB 771837 A 4/1957

OTHER PUBLICATIONS

European Application No. 23184295.6 filed Jul. 7, 2023; Extended European Search Report dated Dec. 4, 2023; 7 pages.

*Primary Examiner* — Alain Chau
(74) *Attorney, Agent, or Firm* — CANTOR COLBURN LLP

(57) ABSTRACT

A two stage fuel delivery system for an aircraft includes a first stage pump including an inlet connected to a source of fuel and an outlet connected to a combustor assembly, and a second stage pump including an inlet portion connected to the source of fuel and an outlet portion connected to the combustor assembly. A bypass valve is connected between the source of fuel, the inlet, and the inlet portion. The bypass valve selectively disconnects the second stage pump from the source of fuel. A metering valve is connected to the inlet and the inlet portion. The metering valve includes a metering valve inlet and a metering valve outlet. A pressure regulating valve is connected to the metering valve. A stage monitoring system is configured to detect a change in operation of the second stage and control the bypass valve.

20 Claims, 5 Drawing Sheets

(56) References Cited

U.S. PATENT DOCUMENTS

| | | | |
|---|---|---|---|
| 8,893,466 B2 | 11/2014 | Reuter | |
| 9,206,775 B2* | 12/2015 | Ripley | F02M 37/0052 |
| 9,334,840 B2 | 5/2016 | Baker | |
| 9,476,358 B2 | 10/2016 | Baker et al. | |
| 9,677,477 B2* | 6/2017 | Oba | F02C 7/236 |
| 9,850,917 B2* | 12/2017 | Mueller | F15B 11/02 |
| 9,885,287 B2* | 2/2018 | Striker | F02C 7/224 |
| 10,041,497 B2 | 8/2018 | Nyzen et al. | |
| 10,294,866 B2 | 5/2019 | Baker | |
| 10,890,117 B2 | 1/2021 | Chalaud et al. | |
| 2007/0113554 A1 | 5/2007 | Yates et al. | |
| 2012/0045348 A1* | 2/2012 | Garry | F04B 23/04 |
| | | | 417/302 |
| 2013/0192679 A1* | 8/2013 | Ripley | F02M 31/166 |
| | | | 417/205 |
| 2016/0076452 A1* | 3/2016 | Striker | F02C 7/224 |
| | | | 60/734 |
| 2016/0084272 A1* | 3/2016 | Mueller | B64D 37/34 |
| | | | 60/445 |
| 2016/0201564 A1* | 7/2016 | Oba | F23K 5/04 |
| | | | 137/565.3 |
| 2018/0045122 A1 | 2/2018 | Veilleux | |
| 2019/0112987 A1* | 4/2019 | O'Rorke | F02K 3/10 |
| 2020/0300169 A1* | 9/2020 | Turney | F02C 7/32 |

\* cited by examiner

TWO STAGE FUEL DELIVERY SYSTEM FOR AN AIRCRAFT

BACKGROUND

Exemplary embodiments pertain to the art of aircraft and, more particularly, to a two stage fuel delivery system for an aircraft.

Aircraft typically employ a fixed displacement pump to deliver fuel to combustors. The fixed displacement pump is sized to deliver a fuel flow that satisfies a peak flow demand operating condition such as takeoff. In other than peak flow demand operating conditions, a portion of fuel needed to satisfy demand is passed to the combustor while the remaining portion of the fuel bypasses the combustors to serve other purposes.

BRIEF DESCRIPTION

Disclosed is a two stage fuel delivery system for an aircraft including a first stage pump including an inlet connected to a source of fuel and an outlet connected to a combustor assembly, a second stage pump includes an inlet portion connected to the source of fuel and an outlet portion connected to the combustor assembly. A bypass valve is connected between the source of fuel, the inlet, and the inlet portion. The bypass valve selectively disconnects the second stage pump from the source of fuel. A metering valve is connected to the inlet and the inlet portion. The metering valve includes a metering valve inlet and a metering valve outlet. A pressure regulating valve is connected to the metering valve. A stage monitoring system is configured to detect a change in operation of the second stage and control the bypass valve to disconnect the second stage pump from the source of fuel.

Additionally, or alternatively, in this or other non-limiting examples, the stage monitoring system includes a pressure sensor including a pressure sensor inlet fluidically connected to the metering valve inlet and a pressure sensor outlet fluidically connected to the metering valve outlet.

Additionally, or alternatively, in this or other non-limiting examples, the stage monitoring system includes a controller connected to the pressure sensor, the controller including a stage monitoring module configured to detect one of an activation and a deactivation of the second stage pump based on a pressure change across the metering valve.

Additionally, or alternatively, in this or other non-limiting examples, the stage monitoring system includes a position sensor operatively connected to the bypass valve.

Additionally, or alternatively, in this or other non-limiting examples, the position sensor comprises a linear variable differential transformer (LVDT) sensor.

Additionally, or alternatively, in this or other non-limiting examples, the stage monitoring system includes a controller connected to the position sensor, the controller including a stage monitoring module configured to detect one of an activation and a deactivation of the second stage pump based on a positional change of the bypass valve.

Additionally, or alternatively, in this or other non-limiting examples, the stage monitoring system includes a position sensor operatively connected to the pressure regulating valve.

Additionally, or alternatively, in this or other non-limiting examples, the position sensor comprises a linear variable differential transformer (LVDT) sensor.

Additionally, or alternatively, in this or other non-limiting examples, the stage monitoring system includes a controller connected to the position sensor, the controller including a stage monitoring module configured to detect one of an activation and a deactivation of the second stage pump based on a positional change of the pressure regulating valve.

Additionally, or alternatively, in this or other non-limiting examples, the stage monitoring system includes a pressure sensor connected to the outlet portion of the second stage pump and a controller connected to the pressure sensor, the controller including a stage monitoring module configured to detect one of an activation and a deactivation of the second stage pump based on change in pressure at the outlet portion.

Also disclosed is n aircraft engine system including a compressor portion, a turbine portion, a combustor assembly fluidically connected to the compressor portion and the turbine portion, and a two stage fuel delivery system fluidically connected to the combustor assembly. The two stage fuel delivery system includes a first stage pump including an inlet connected to a source of fuel and an outlet connected to a combustor assembly, a second stage pump includes an inlet portion connected to the source of fuel and an outlet portion connected to the combustor assembly. A bypass valve is connected between the source of fuel, the inlet, and the inlet portion. The bypass valve selectively disconnects the second stage pump from the source of fuel. A metering valve is connected to the inlet and the inlet portion. The metering valve includes a metering valve inlet and a metering valve outlet. A pressure regulating valve is connected to the metering valve. A stage monitoring system is configured to detect a change in operation of the second stage and control the bypass valve to disconnect the second stage pump from the source of fuel.

Additionally, or alternatively, in this or other non-limiting examples, the stage monitoring system includes a pressure sensor including a pressure sensor inlet fluidically connected to the metering valve inlet and a pressure sensor outlet fluidically connected to the metering valve outlet.

Additionally, or alternatively, in this or other non-limiting examples, the stage monitoring system includes a controller connected to the pressure sensor, the controller including a stage monitoring module configured to detect one of an activation and a deactivation of the second stage pump based on a pressure change across the metering valve.

Additionally, or alternatively, in this or other non-limiting examples, the stage monitoring system includes a position sensor operatively connected to the bypass valve.

Additionally, or alternatively, in this or other non-limiting examples, the position sensor comprises a linear variable differential transformer (LVDT) sensor.

Additionally, or alternatively, in this or other non-limiting examples, the stage monitoring system includes a controller connected to the position sensor, the controller including a stage monitoring module configured to detect one of an activation and a deactivation of the second stage pump based on a positional change of the bypass valve.

Additionally, or alternatively, in this or other non-limiting examples, the stage monitoring system includes a position sensor operatively connected to the pressure regulating valve.

Additionally, or alternatively, in this or other non-limiting examples, the position sensor comprises a linear variable differential transformer (LVDT) sensor.

Additionally, or alternatively, in this or other non-limiting examples, the stage monitoring system includes a controller connected to the position sensor, the controller including a stage monitoring module configured to detect one of an activation and a deactivation of the second stage pump based on a positional change of the pressure regulating valve.

Additionally, or alternatively, in this or other non-limiting examples, the stage monitoring system includes a pressure sensor connected to the outlet portion of the second stage pump and a controller connected to the pressure sensor, the controller including a stage monitoring module configured to detect one of an activation and a deactivation of the second stage pump based on change in pressure at the outlet portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
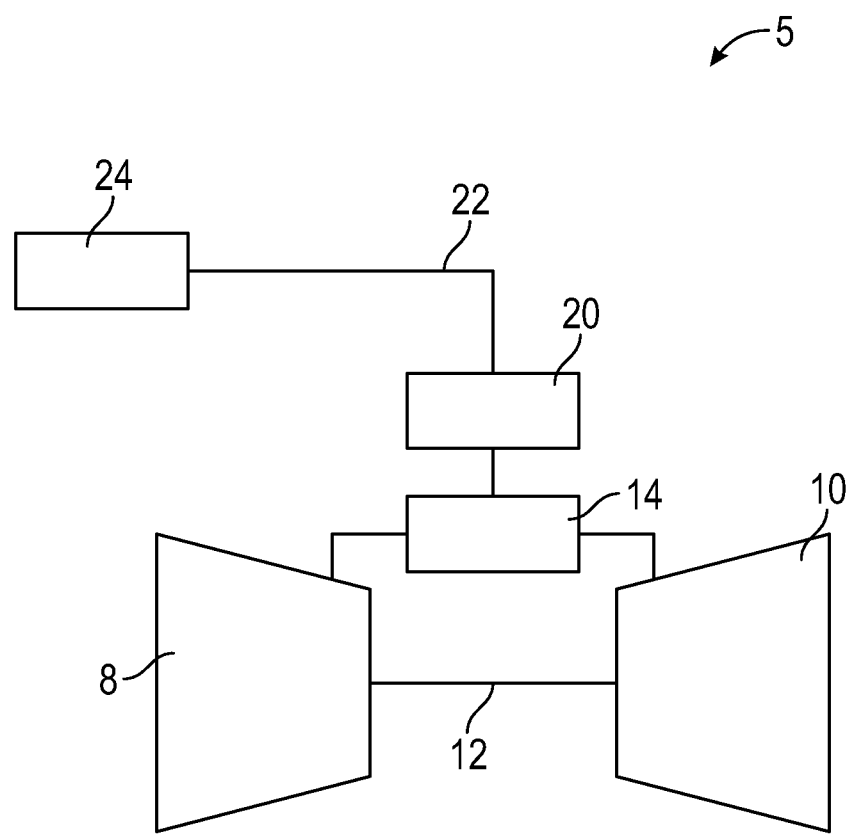
FIG. 1 is a schematic depiction of an engine for an aircraft including a two stage fuel delivery system, in accordance with a non-limiting example.

An air-breathing aircraft engine system is indicated generally at 5 in FIG. 1. Air-breathing aircraft engine system 5 includes a compressor portion 8 operatively coupled to a turbine portion 10 through a shaft 12. A combustor assembly 14 is fluidically connected between compressor portion 8 and turbine portion 10. A two stage fuel delivery system 20 includes a fuel inlet 22 and fluidically connects combustor assembly 14 with a source of fuel 24. Two stage fuel delivery system 20 may receive fuel directly from source of fuel 24 at fuel inlet 22 or, through a compressor stage (not shown) that creates an input pressure for the fuel.

Figure 2:
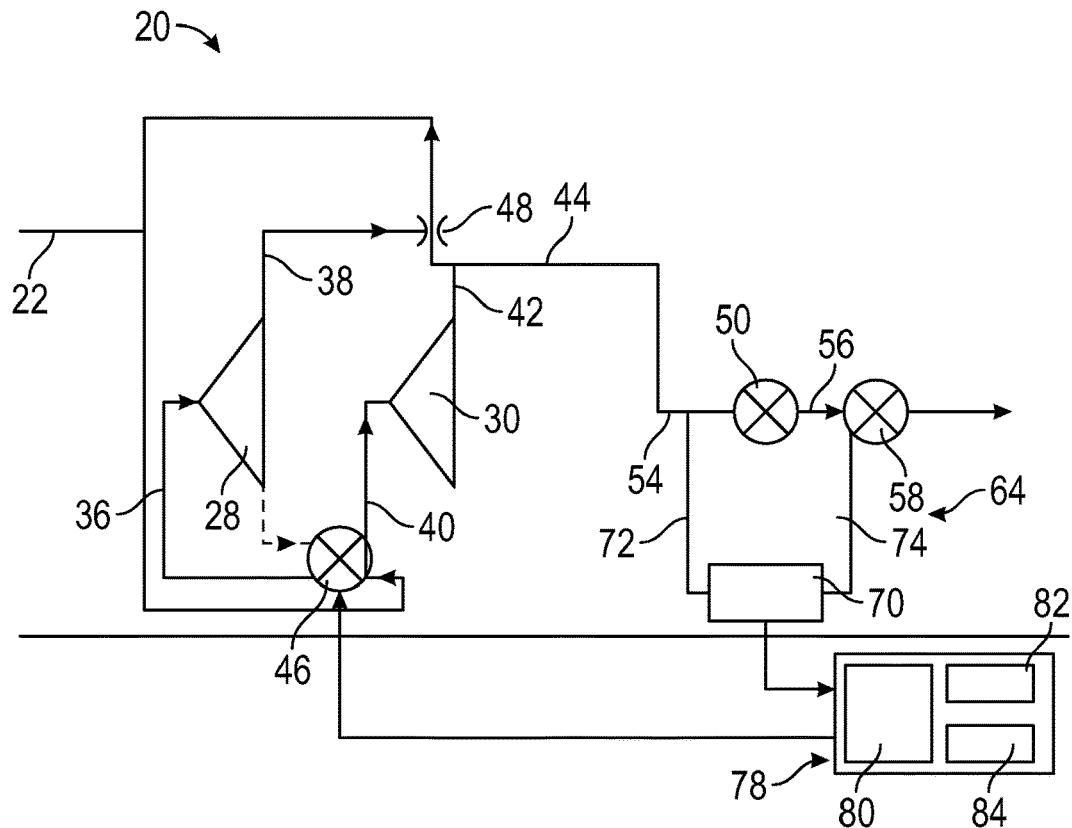
FIG. 2 is a schematic view of the two stage fuel delivery system of FIG. 1 with a first stage being operational and a second stage being idled, in accordance with a non-limiting example.
Figure 3:
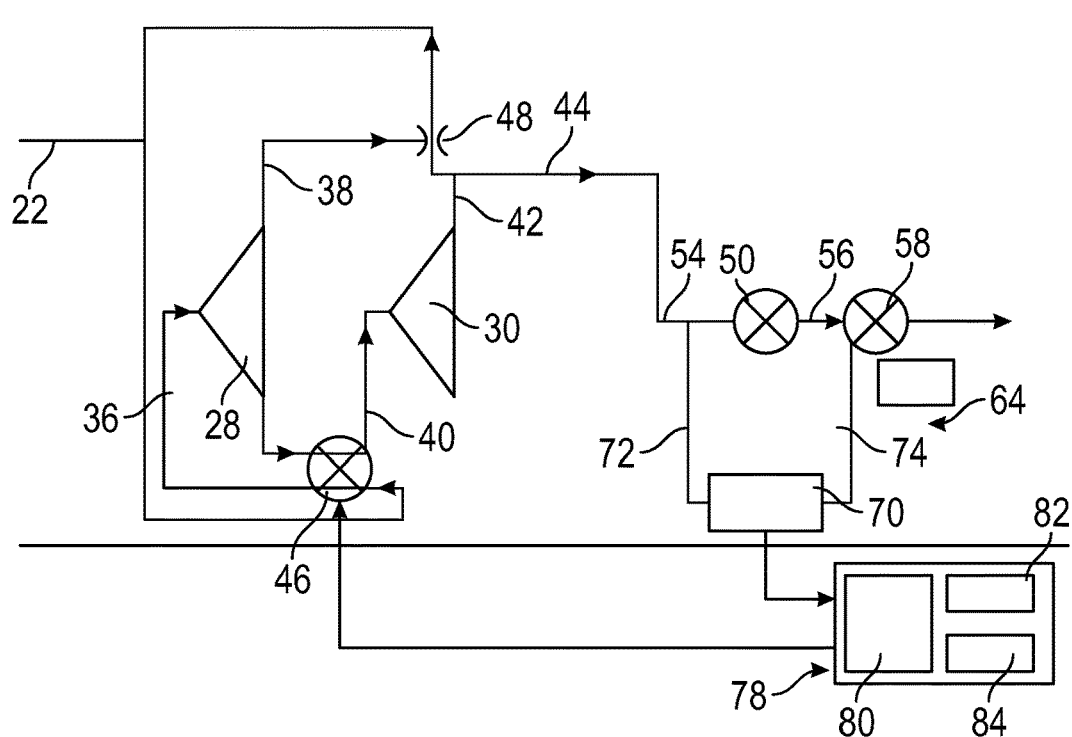
FIG. 3 is a schematic view of the two stage fuel delivery system of FIG. 1 with both the first stage and the second stage in operation, in accordance with a non-limiting example.

Reference will now follow to FIGS. 2 and 3 in describing two stage fuel delivery system 20 in accordance with a non-limiting example. Two stage fuel delivery system 20 includes a first stage pump 28 and a second stage pump 30. First stage pump 28 includes an inlet 36 connected to fuel inlet 22 and an outlet 38. Second stage pump 30 is connected in series to first stage pump 28 and includes an inlet portion 40 fluidically connected to fuel inlet 22 and an outlet portion 42. Outlet 38 and outlet portion 42 combine at a fuel feed 44. A bypass valve 46 fluidically connects first stage pump 28 with second stage pump 30. An ejector pump 46 is coupled to outlet 38 and fuel feed 44. Ejector pump 46 receives a high velocity flow from fuel feed 44 which creates a vacuum. The vacuum draws fuel from outlet 38 and guides the fuel toward fuel inlet 22

Two stage fuel delivery system 20 is further shown to include a metering valve 50 having a metering valve inlet 54 connected to fuel feed 44 and a metering valve outlet 56. A pressure regulating valve 58 is connected to metering valve outlet 56. Pressure regulating valve 58 delivers fuel to combustor assembly 14. In a non-limiting example, during normal flight operations, such as cruise, bypass valve 46 is closed, first stage pump 28 is starved of fuel, and fuel passes from second stage pump 30 via outlet portion 42 to metering valve 50 as shown in FIG. 2.

During transitional operations, such as take-off, landing, and altitude changes, bypass valve opens to deliver fuel through second stage pump 30. Fuel then passes from first stage pump 28 into second stage pump 30 and from outlet portion 42 to metering valve 50 as shown in FIG. 3. Second stage pump 30 boosts fuel supply pressure to meet the increased demand of the transitional operations.

In a non-limiting example, two stage fuel delivery system 20 includes a stage monitoring system 64 that detects transitions between one stage operation and two stage operation of first stage pump 28 and second stage pump 30. In a non-limiting example, stage monitoring system 64 includes a pressure sensor 70 having a pressure sensor inlet 72 fluidically connected to metering valve inlet 54 and a pressure sensor outlet 74 fluidically connected to metering valve outlet 56. As will be detailed more fully herein, pressure sensor 70 detects pressure changes across metering valve 50.

In a non-limiting example, stage monitoring system 64 includes a controller 78 including a central processing unit (CPU) 80, a non-volatile memory 82, and a stage monitoring module 84. While shown as being co-located, each of the components of controller 78 may form part of one or more other devices. In a non-limiting example, stage monitoring module 84 evaluates pressure signals from pressure sensor 70. Based on instructions stored in non-volatile memory 82, CPU 80 may issue a signal to close bypass valve 46. That is, when second stage pump 30 ceases operation, e.g., is disengaged or is in operation, e.g., engaged, pressure sensor 70 will detect a change in pressure at metering valve 50. That change in pressure signals controller 78 that bypass valve 46 has moved as commanded.

Figure 4:
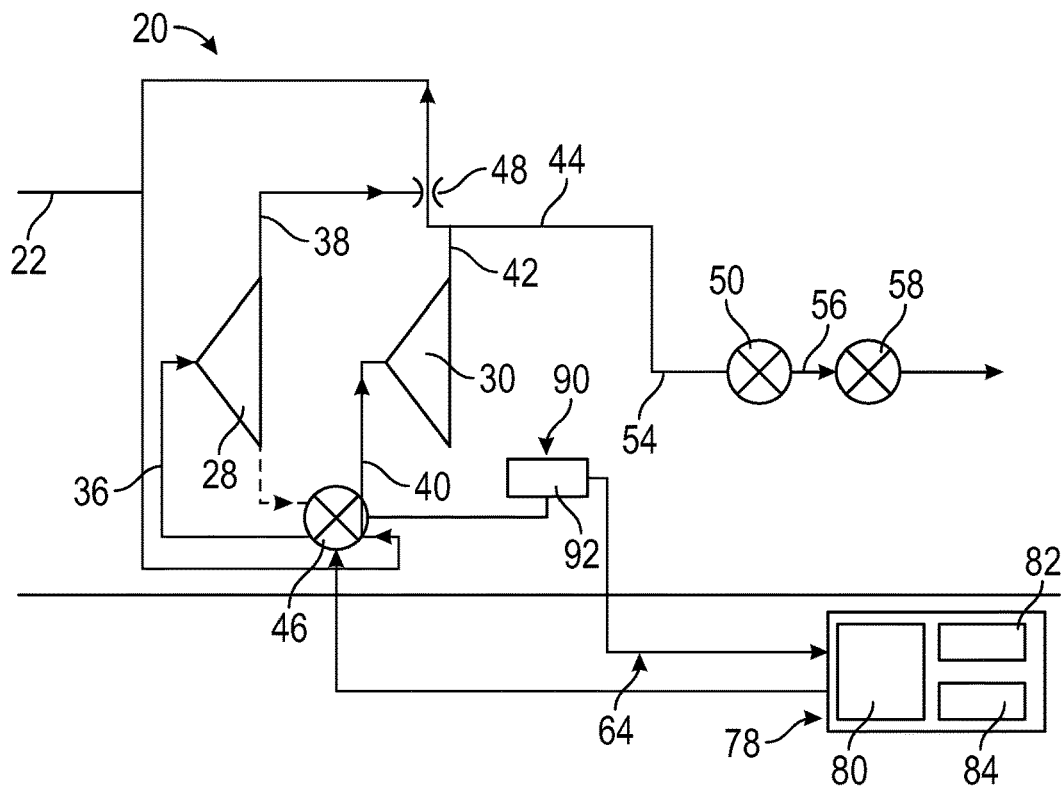
FIG. 4 is a schematic view of the two stage fuel delivery system of FIG. 1 with a first stage being operational and a second stage being idled, in accordance with another non-limiting example.
Figure 5:
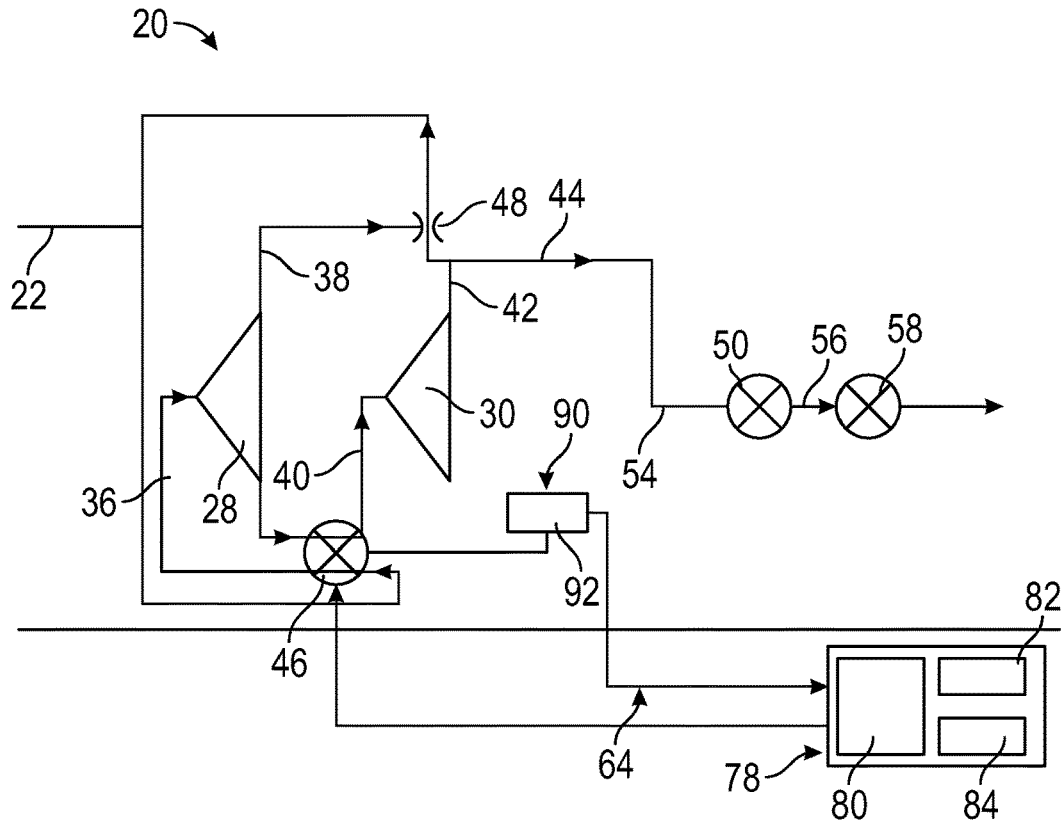
FIG. 5 is a schematic view of the two stage fuel delivery system of FIG. 1 with both the first stage and the second stage in operation, in accordance with the another non-limiting example.

In another non-limiting example shown in FIGS. 4 and 5, wherein like reference numbers represent corresponding parts in the respective views, stage monitoring system 64 may include a position sensor 90 connected to bypass valve 46. Position sensor 90 may take the form of a linear variable differential transformer (LVDT) sensor 92 that may be coupled to bypass valve 46. In a non-limiting example, stage monitoring module 84 detects a position of bypass valve 46.

During single stage operation as shown in FIG. 4, bypass valve 46 is closed. During a two stage operation as shown in FIG. 5, bypass valve 46 opens to allow fuel to flow from first stage pump 28 to second stage pump 30 via inlet 40 such that a greater amount of fuel may be delivered to combustor assembly 14.

In a non-limiting example, stage monitoring module 84 evaluates position signals from position sensor 90. Based on instructions stored in non-volatile memory 82, CPU 80 may issue a signal to close bypass valve 46. That is, when second stage pump 30 is engaged, position sensor 90 detects a change in position of bypass valve 46 which is passed to controller 78.

Figure 6:
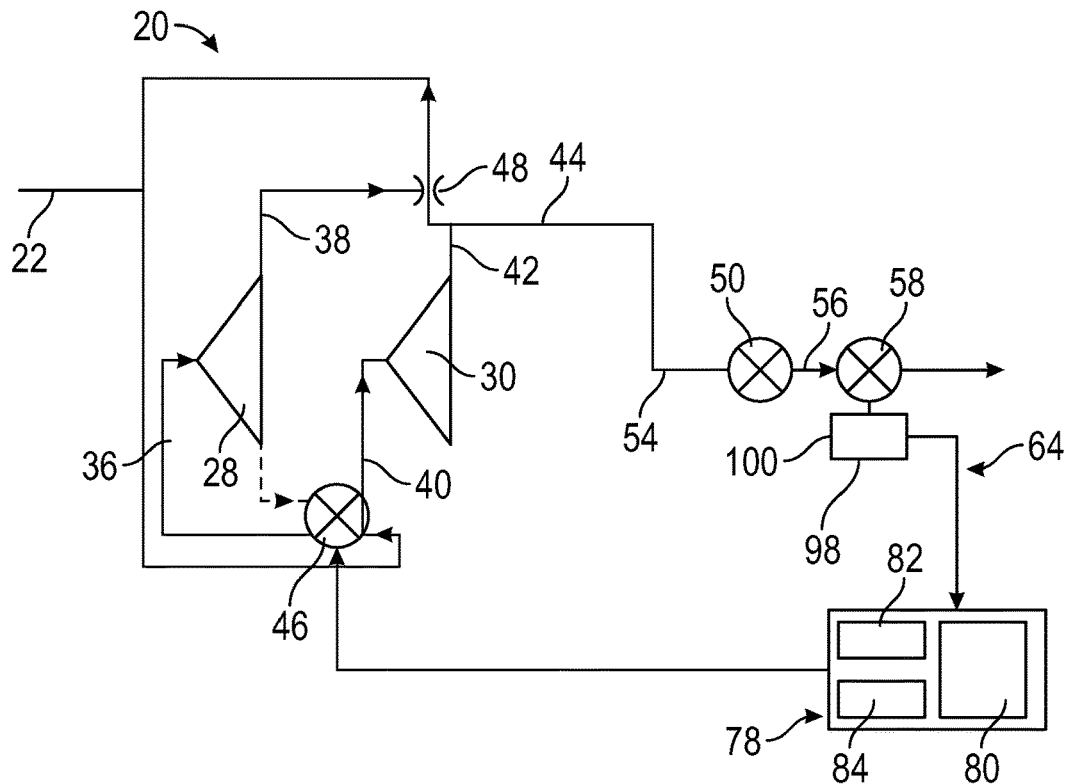
FIG. 6 is a schematic view of the two stage fuel delivery system of FIG. 1 with a first stage being operational and a second stage being idled, in accordance with yet another non-limiting example.
Figure 7:
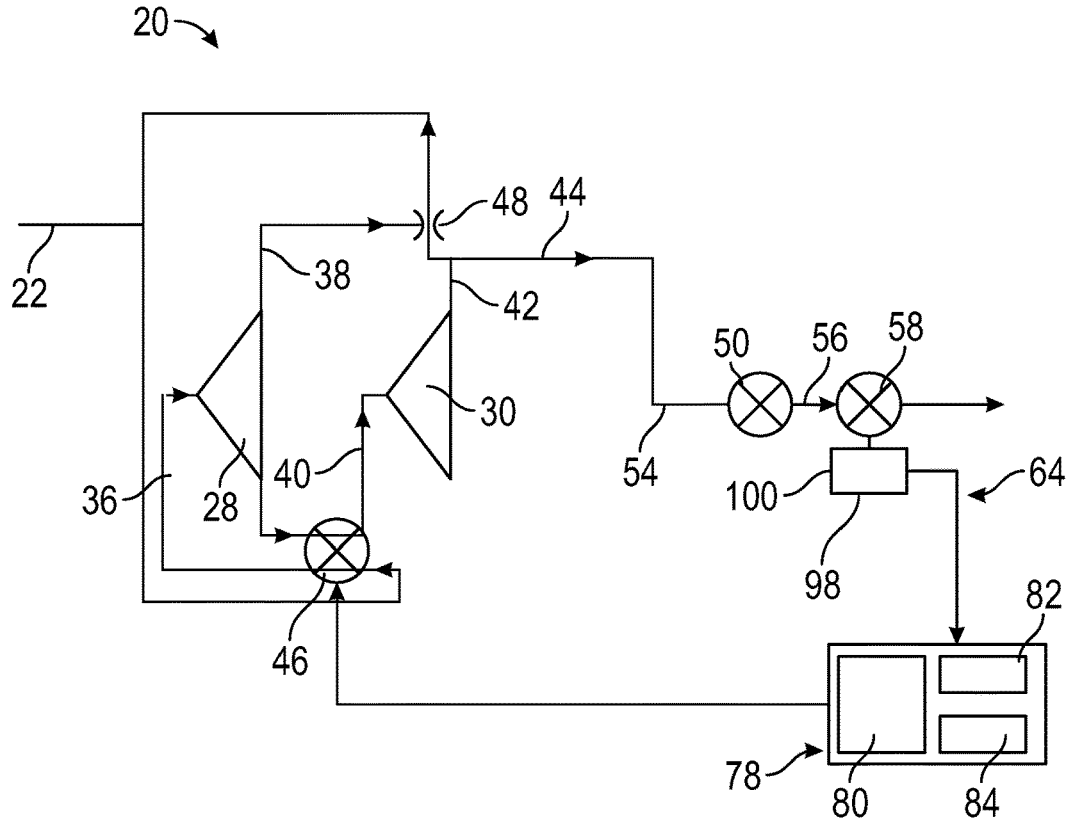
FIG. 7 is a schematic view of the two stage fuel delivery system of FIG. 1 with both the first stage and the second stage in operation, in accordance with the yet another non-limiting example.

In another non-limiting example shown in FIGS. 6 and 7, wherein like reference numbers represent corresponding parts in the respective views, stage monitoring system 64 may include a position sensor 98 connected to pressure regulating valve 58. Position sensor 98 may take the form of a linear variable differential transformer (LVDT) sensor 100. In a non-limiting example, stage monitoring module 84 detects a position of pressure regulating valve 58. During single stage operation as shown in FIG. 6, pressure regulating valve 58 is open to a first position. During a two stage operation as shown in FIG. 7, pressure regulating valve 58 is open a second position in response to higher supply pressures provided by second stage pump 30.

In a non-limiting example, stage monitoring module 84 evaluates position signals from position sensor 98. Based on instructions stored in non-volatile memory 82, CPU 80 may issue a signal to close or open bypass valve 46. That is, when second stage pump 30 is disengaged or engaged, position sensor 98 detects a positional change of pressure regulating valve 58 to accommodate a change in fuel flow. LVDT sensor 100 provides position feedback confirming that pressure regulating valve 58 responded to a pressure change created by switching between single and dual pump operation.

Figure 8:
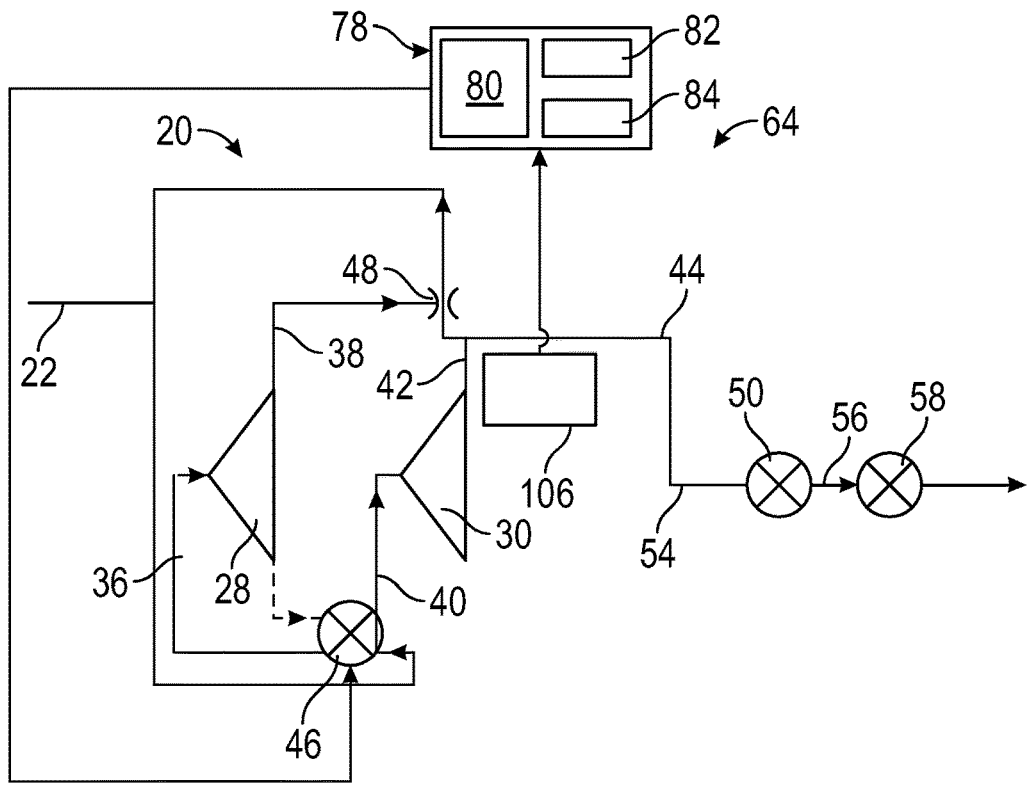
FIG. 8 is a schematic view of the two stage fuel delivery system of FIG. 1 with a first stage being operational and a second stage being idled, in accordance with still yet another non-limiting example.
Figure 9:
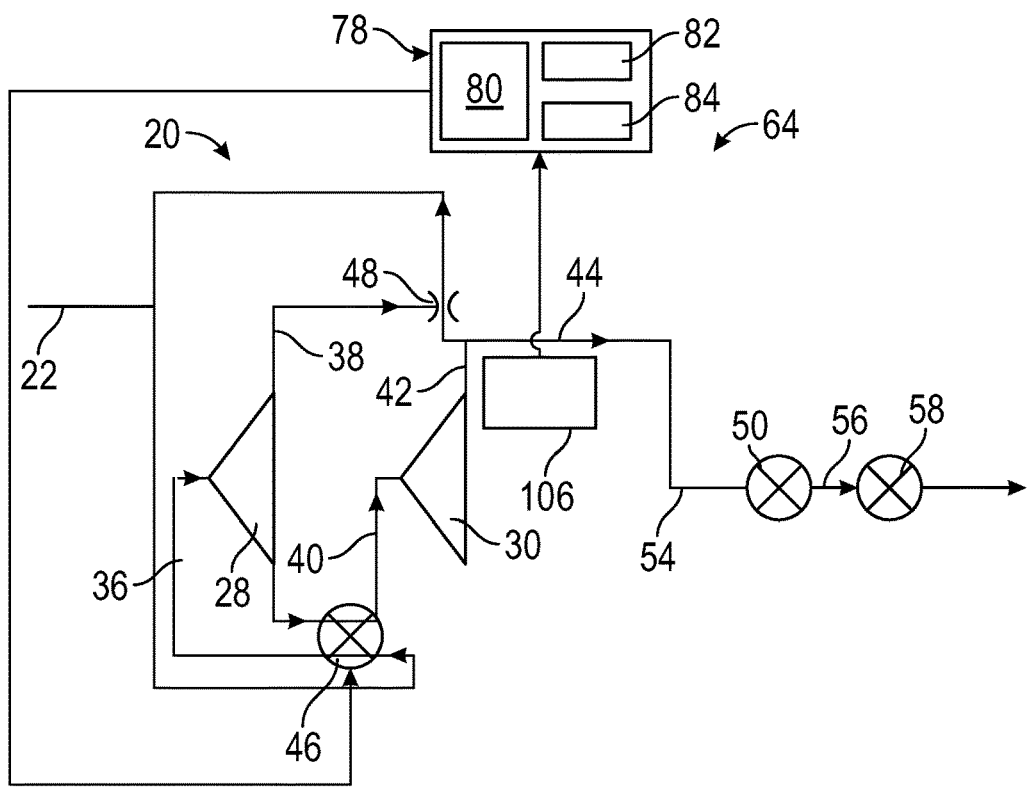
FIG. 9 is a schematic view of the two stage fuel delivery system of FIG. 1 with both the first stage and the second stage in operation, in accordance with the still yet another non-limiting example.

In yet another non-limiting example shown in FIGS. 8 and 9, wherein like reference numbers represent corresponding parts in the respective views, stage monitoring system 64 may include a pressure sensor 106 connected to fuel feed 44.

In a non-limiting example, stage monitoring module 84 detects a change in fuel pressure passing through fuel feed 44. During single stage operation as shown in FIG. 8, fuel pressure in fuel feed 44 is at a first level. During a two stage operation as shown in FIG. 9, fuel pressure in fuel feed 44 is at a second level that is greater than the first level due to the combined operation of first stage pump 28 and second stage pump 30.

When second stage pump 30 is disengaged or engaged, pressure sensor 106 detects a change of fuel pressure in fuel feed 44. That change in pressure is provided as a feedback signal to controller 78 confirming the change between single and dual pump operation modes.

In a non-limiting example, in addition to detecting an operational status of second stage pump 30, stage monitoring system 64 may also evaluate pump health. That is, by evaluating signals from the pressure sensor or the position sensor, stage monitoring module 84 can track output pressure differences from second stage pump 30 and, as a result, determine pump health and provide a predictive need for pump maintenance. For example, stage monitoring system 64 can detect changes in pump pressure through the pressure sensor that could signal a degrading pump and a need for maintenance. Stage monitoring module 84 can also detect changes in the positional signal from the position sensor indicating pressure reductions at the metering valve or the pressure regulating valve that could indicate a degrading pump signaling a need for maintenance.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A two stage fuel delivery system for an aircraft comprising:
    a first stage pump including an inlet connected to a source of fuel and an outlet connected to a combustor assembly;
    a second stage pump including an inlet portion connected to the source of fuel and an outlet portion connected to the combustor assembly;
    a bypass valve connecting the source of fuel to the inlet and to the inlet portion, the bypass valve selectively disconnecting the second stage pump from the source of fuel;
    a metering valve connected to the outlet and to the outlet portion, the metering valve including a metering valve inlet and a metering valve outlet;
    a pressure regulating valve connected to the metering valve; and
    a stage monitoring system configured to detect a change in operation of the second stage and control the bypass valve to disconnect the second stage pump from the source of fuel.

2. The two stage fuel delivery system according to claim 1, wherein the stage monitoring system includes a pressure sensor including a pressure sensor inlet fluidically connected to the metering valve inlet and a pressure sensor outlet fluidically connected to the metering valve outlet.

3. The two stage fuel delivery system according to claim 2, wherein the stage monitoring system includes a controller connected to the pressure sensor, the controller including a stage monitoring module configured to detect one of an activation and a deactivation of the second stage pump based on a pressure change across the metering valve.

4. The two stage fuel delivery system according to claim 1, wherein the stage monitoring system includes a position sensor operatively connected to the bypass valve.

5. The two stage fuel delivery system according to claim 4, wherein the position sensor comprises a linear variable differential transformer (LVDT) sensor.

6. The two stage fuel delivery system according to claim 4, wherein the stage monitoring system includes a controller connected to the position sensor, the controller including a stage monitoring module configured to detect one of an activation and a deactivation of the second stage pump based on a positional change of the bypass valve.

7. The two stage fuel delivery system according to claim 1, wherein the stage monitoring system includes a position sensor operatively connected to the pressure regulating valve.

8. The two stage fuel delivery system according to claim 7, wherein the position sensor comprises a linear variable differential transformer (LVDT) sensor.

9. The two stage fuel delivery system according to claim 7, wherein the stage monitoring system includes a controller connected to the position sensor, the controller including a stage monitoring module configured to detect one of an activation and a deactivation of the second stage pump based on a positional change of the pressure regulating valve.

10. The two stage fuel delivery system according to claim 1, wherein the stage monitoring system includes a pressure sensor connected to the outlet portion of the second stage pump and a controller connected to the pressure sensor, the controller including a stage monitoring module configured to detect one of an activation and a deactivation of the second stage pump based on change in pressure at the outlet portion.

11. An aircraft engine system comprising:
a compressor portion;
a turbine portion;
a combustor assembly fluidically connected to the compressor portion and the turbine portion; and
a two stage fuel delivery system fluidically connected to the combustor assembly, the two stage fuel delivery system comprising:
  a first stage pump including an inlet connected to a source of fuel and an outlet connected to the combustor assembly;
  a second stage pump including an inlet portion connected to the source of fuel and an outlet portion connected to the combustor assembly;
  a bypass valve connecting the source of fuel to the inlet and to the inlet portion, the bypass valve selectively disconnecting the second stage pump from the source of fuel;
  a metering valve connected to the outlet and to the outlet portion, the metering valve including a metering valve inlet and a metering valve outlet;
  a pressure regulating valve connected to the metering valve; and
  a stage monitoring system configured to detect a change in operation of the second stage and control the bypass valve to disconnect the second stage pump from the source of fuel.

12. The aircraft engine system according to claim 11, wherein the stage monitoring system includes a pressure sensor including a pressure sensor inlet fluidically connected to the metering valve inlet and a pressure sensor outlet fluidically connected to the metering valve outlet.

13. The aircraft engine system according to claim 12, wherein the stage monitoring system includes a controller connected to the pressure sensor, the controller including a stage monitoring module configured to detect one of an activation and a deactivation of the second stage pump based on a pressure change across the metering valve.

14. The aircraft engine system according to claim 11, wherein the stage monitoring system includes a position sensor operatively connected to the bypass valve.

15. The aircraft engine system according to claim 14, wherein the position sensor comprises a linear variable differential transformer (LVDT) sensor.

16. The aircraft engine system according to claim 14, wherein the stage monitoring system includes a controller connected to the position sensor, the controller including a stage monitoring module configured to detect one of an activation and a deactivation of the second stage pump based on a positional change of the bypass valve.

17. The aircraft engine system according to claim 11, wherein the stage monitoring system includes a position sensor operatively connected to the pressure regulating valve.

18. The aircraft engine system according to claim 17, wherein the position sensor comprises a linear variable differential transformer (LVDT) sensor.

19. The aircraft engine system according to claim 17, wherein the stage monitoring system includes a controller connected to the position sensor, the controller including a stage monitoring module configured to detect one of an activation and a deactivation of the second stage pump based on a positional change of the pressure regulating valve.

20. The aircraft engine system according to claim 11, wherein the stage monitoring system includes a pressure sensor connected to the outlet portion of the second stage pump and a controller connected to the pressure sensor, the controller including a stage monitoring module configured to detect one of an activation and a deactivation of the second stage pump based on change in pressure at the outlet portion.

* * * * *